United States Patent
Rymal, Jr. et al.

[11] Patent Number: 5,368,747
[45] Date of Patent: Nov. 29, 1994

[54] FLUID SEPARATION SYSTEM AND METHOD

[75] Inventors: Theodore R. Rymal, Jr., S.V. Hash-Keta, Gallion Marina #42, 617 Front St., Key West, Fla. 33040; Theodore R. Rymal, III, The Woodlands; Robert J. Burns, La Feria, both of Tex.

[73] Assignee: Theodore R. Rymal, Jr., Key West, Fla.

[21] Appl. No.: 16,856

[22] Filed: Feb. 13, 1993

Related U.S. Application Data

[60] Continuation-in-part of Ser. No. 904,212, Jul. 30, 1992, Pat. No. 5,202,031, which is a division of Ser. No. 560,436, Jul. 31, 1990, Pat. No. 5,147,534.

[51] Int. Cl.$^5$ .................................. B01D 17/038
[52] U.S. Cl. ............................. 210/744; 210/137; 210/304; 210/512.1; 210/534; 210/537; 210/788; 210/800; 210/DIG. 5
[58] Field of Search ............... 210/104, 109, 110, 115, 210/117, 242.1, 513, 295, 532.1, 534, 536, 537, 739, 744, 799, 800, 804, DIG. 5, 304, 512.1, 540, 787, 788, 137

[56] References Cited

U.S. PATENT DOCUMENTS

| | | | |
|---|---|---|---|
| 1,159,044 | 11/1915 | Kelly | 210/221.1 |
| 2,047,989 | 7/1936 | Woelfin | 210/708 |
| 3,425,556 | 2/1969 | Volker | 210/97 |
| 3,764,008 | 10/1973 | Darley et al. | 210/703 |
| 3,966,615 | 6/1976 | Petchul et al. | 210/242.1 |
| 4,045,344 | 8/1977 | Yokota | 210/106 |
| 4,123,357 | 10/1978 | Clements et al. | 210/774 |
| 4,237,006 | 12/1980 | Colman et al. | 210/512.1 |
| 4,252,649 | 2/1981 | Favret,Jr. | 210/110 |
| 4,431,534 | 2/1984 | Gordon | 210/110 |
| 4,492,630 | 1/1985 | Rymal, Jr. | 210/117 |
| 4,597,863 | 6/1986 | Rymal, Jr. | 210/117 |
| 5,147,534 | 9/1992 | Rymal, Jr. | 210/104 |
| 5,202,031 | 4/1993 | Rymal | 210/800 |
| 5,229,015 | 7/1993 | Keep et al. | 210/799 |
| 5,252,229 | 10/1993 | Rojey et al. | 210/512.1 |
| 5,286,383 | 2/1994 | Verret et al. | 210/540 |

Primary Examiner—Joseph W. Drodge
Attorney, Agent, or Firm—Browning, Bushman, Anderson & Brookhart

[57] ABSTRACT

Improved techniques are provided for separating mixtures of materials having different densities. The apparatus of the present invention is well suited for separating oil from water, and includes a separation tank defining a cylindrical water inlet chamber and a frustroconical separation chamber spaced above an adjoining the input inlet chamber. An oil leg is spaced above the separation chamber, and an adjustable oil overflow unit is provided adjacent the oil outlet for controlling the height of oil in the oil leg. A water leg is provided in parallel with the separation tank, and the elevation of the water outlet controls the height of water in the water leg. The oil leg overflow unit allows the head pressure in the oil leg relative to the head pressure in the water leg to maintain the interface within the separation chamber. Sensing devices are provided for monitoring the elevation of the oil/water interface within the separation chamber. The techniques may also be used to separate a mixture of a fluid heavier than water, water, and a fluid lighter than water.

20 Claims, 2 Drawing Sheets

FLUID SEPARATION SYSTEM AND METHOD

This application is a continuation in part of application Ser. No. 07/904,212 filed Jul. 30, 1992, now U.S. Pat. No. 5,202,031, which is a divisional of application Ser. No. 07/560,436, filed Jul. 31, 1990, now U.S. Pat. No. 5,147,534.

BACKGROUND OF THE INVENTION

1. Field of the Invention

The present invention relates to methods and apparatus for separating materials of differing densities and, more particularly, relates to improved techniques and equipment for efficiently removing contaminants, such a oil or other hydrocarbons, from water.

2. Description of the Background

Numerous devices have been constructed to remove oil or other contaminants from water. Most of these systems rely upon the difference in density between various liquids, and are thus theoretically capable of separating various solids and/or liquids from a different liquid. Since oil has a typical density 0.346 lbs./per foot (columnar weight), and water has a density of 0.435 lbs./per foot, oil can be skimmed from the surface of water in a settling pond, while water flows under a weir to a discharge stream.

Various factors affect the manner in which petrochemical companies, manufacturing plants, municipal water departments, etc. are and will be handling the removal of oil from waste water. The quantity of water requiring removal of contaminants is tremendous, and billions of dollars are being expended annually to update existing waste water separation systems. Proponents often overrate the water flow volume which a particular separation system can efficiently handle, and users are justifiable skeptical of unproven claims. Environmentalists and government experts recognize that future regulations will control evaporation of hydrocarbons by requiring that settling tanks and ponds be enclosed, thereby substantially increasing the cost of those systems.

U.S. Pat. No. 4,045,344 discloses a system for treating waste water including a bundle of submerged tubes with intermediate passageways. Organic substances are removed by decomposition caused by microorganisms or "bugs" which adhere to the tubes. While some experts tout biodegradation systems with "oil-eating bugs" as the key to future techniques for treating waste water, users recognize that such systems are both expensive and complicate downstream purification or separation systems.

U.S. Pat. No. 4,123,359 assigned to Chevron discloses a system for removing oil and deoiled solids from a sludge utilizing a combination of steps involving stirring, heating with a substantial input of mechanical energy, and sedimentation. U.S. Pat. No. 4,145,280 discloses a system for separating oil and water by passing the mixture first through a moving filter media, separating the coalesced substance by gravity, and filtering the remainder of the impurities from water. U.S. Pat. No. 4,346,086 discloses a vessel which floats on the surface of a body of water. Pumps are provided in the end of downwardly projecting tubes for pumping water in and out of the vessel. Oil is collected from the vessel, and may be subsequently pumped into a storage tanker.

U.S. Pat. No. 4,492,630 discloses a separator with a pair of tanks for separating hydrocarbons and water. The oil/water mixture is fed into the first tank, and water passes through a passageway connecting the first and second tanks. Oil is removed from the top portion of the second tank while water flows to an outlet provided in the bottom portion of the second tank. U.S. Pat. No. 4,597,863 utilizes many of the concepts disclosed in the '630 patent, and discloses a boat-like device for selectively propelling about the surface of a body of water to remove oil from the surface of the water.

U.S. Pat. No. 3,425,556 discloses an oil/water separator with a valve which may be intermittently opened to cause the head pressure in a pipe to discharge oil from the separator. The batch technique disclosed in this reference is not generally preferred, since most operators prefer a system that continuously receives contaminated water and outputs both clean water and separated contaminants in a flow-through process. To achieve the desired separation efficiency, some oil/water separators require first stage and second stage separators, as disclosed in U.S. Pat. Nos. 2,047,989 and 3,764,008.

One of the most commercially used oil/water separation systems is referred to as a "API" or "gun-barrel" system, which includes above-ground tanks typically each 50 to 100 feet in length. The oil/water mixture is continually input at one end of each tank, while water flows by gravity through a lower outlet to a discharge stream, and oil is removed from the surface at the other end of the tank. The gun-barrel separator has long experienced numerous problems. Oil tends to "weather" due to naturally occurring biodegradation and forms a "BS & G layer" or "rag layer", which detract from the efficient separation of oil from the water. Light oil with a density less than the rag layer cannot penetrate through the rag layer to the surface. Consequently, water rather than oil is commonly recovered from the surface of the tank, and a high concentration of a entrained oil droplets flow with the water to the downstream system.

The disadvantages of the prior art are overcome by the present invention, and a relatively inexpensive and highly efficient system is hereinafter disclosed for separating a mixture of different density materials. The concepts of the present invention are particularly well suited for removing oil and other hydrocarbons from waste water.

SUMMARY OF THE INVENTION

While the system according to the present invention may be used to separate various mixtures of different density liquids or solid/liquid mixtures, the invention will be particularly described from recovering oil and similar hydrocarbons from water. The system includes either a single stage or multi-stage collectors, depending on the extent of degradation the oil has undergone prior to entering the system, and the desired clarity of the cleaned water.

In one embodiment, an oil/water mixture may be tangentially input to a cylindrical portion of the separator, preferably at a velocity of less than approximately 30 meters/minute or less to minimize turbulence. Oil continually migrates upward into a upper conical portion of the separator, cleaned water is continually removed through an outlet located in the lower portion of the cylindrical section, and sludge or solids fall to a lower conical section of the separator where they may be periodically removed. The separator employs both an oil leg extending upward from the apex of the conical portion, and a water leg extending upward from the water outlet and outward of the cylindrical portion. The oil leg and the water leg together formed a U-tube configuration, which desirably maintains the oil/water interface within the separator under a slight positive pressure.

Since the quantity of oil in the input mixture will likely vary considerably with time, both the oil leg and the water leg are sized under the assumption that the separator unit will be receiving and will discharge 100% oil or 100% water through the respective leg. The water leg preferably has a substantially uniform cross sectional configuration such that the velocity of water through the water leg will approximately 15 meters/minutes or less. The substantially uniform cross section of the oil leg will be such that the velocity of oil through this leg will be less than approximately 7 meters/minute if fluid input to the separator unit was 100% oil. In order to minimize vertical fluctuation of the oil/water interface within the separator when the input mixture composition changes, the length of the oil weir overflow and the length of the water weir overflow are substantially equalized. If desired, a precoalescing unit may be provided for mechanically breaking an oil locator emulsion prior to the mixture passing through the inlet pipe to the separator. The separator itself may be provided with a coalescing media selected according to the intended application. Ports for heaters may also be provided, and an auger may be utilized for the removal of high viscosity oils or solid contaminants less dense than water.

In another embodiment, the invention may be used for separating a mixture, such as water and creosote, which is more dense than water. Oil may be separated from water and passed upward through an oil leg, while creosote is passed from a lower separation chamber through a creosote leg. The water leg, oil leg, and creosote leg are all balanced according to the technique of the present invention.

It is an object of the present invention to provide a relatively low cost, highly efficient system suitable for removing oil from waste water.

It is a further object of this invention to provide an improved separation technique which is capable of handling large volumes of water while outputting water much cleaner than prior art systems.

Yet another object of the invention is to provide an improved separator utilizing a U-tube concept to create a balanced pressure, wherein the significance of both the columnar height and the flow velocity of fluid in each leg are recognized as affecting pressure.

It is a feature of the present invention that the system may separate oil from water, and may also separate both oil and partially decomposed oil from waste water.

It is a significant feature of this invention that the separation units may be enclosed to control evaporation of hydrocarbons.

A further feature of this invention is that the separator may be used for simultaneously separating a mixture of a fluid lighter than water (such as oil), water, and a fluid heavier than water (such as creosote).

It is an advantage of the present system that a relatively small space is required to reliably separate large volumes of an oil/water mixture.

It is another advantage of the system according to the present invention that it may easily adjusted to accommodate density changes in one or both of the materials to be separated.

It is a further advantage of this invention that both the first and second stage collection units may be formed from cylindrical-shaped tanks, thereby substantially reducing manufacturing costs.

These and further objects, features, and advantages of the present invention will become apparent from the following detailed description, wherein reference is made to the figures in the accompanying drawings.

DETAILED DESCRIPTION OF PREFERRED EMBODIMENTS

Figures 1, 2:
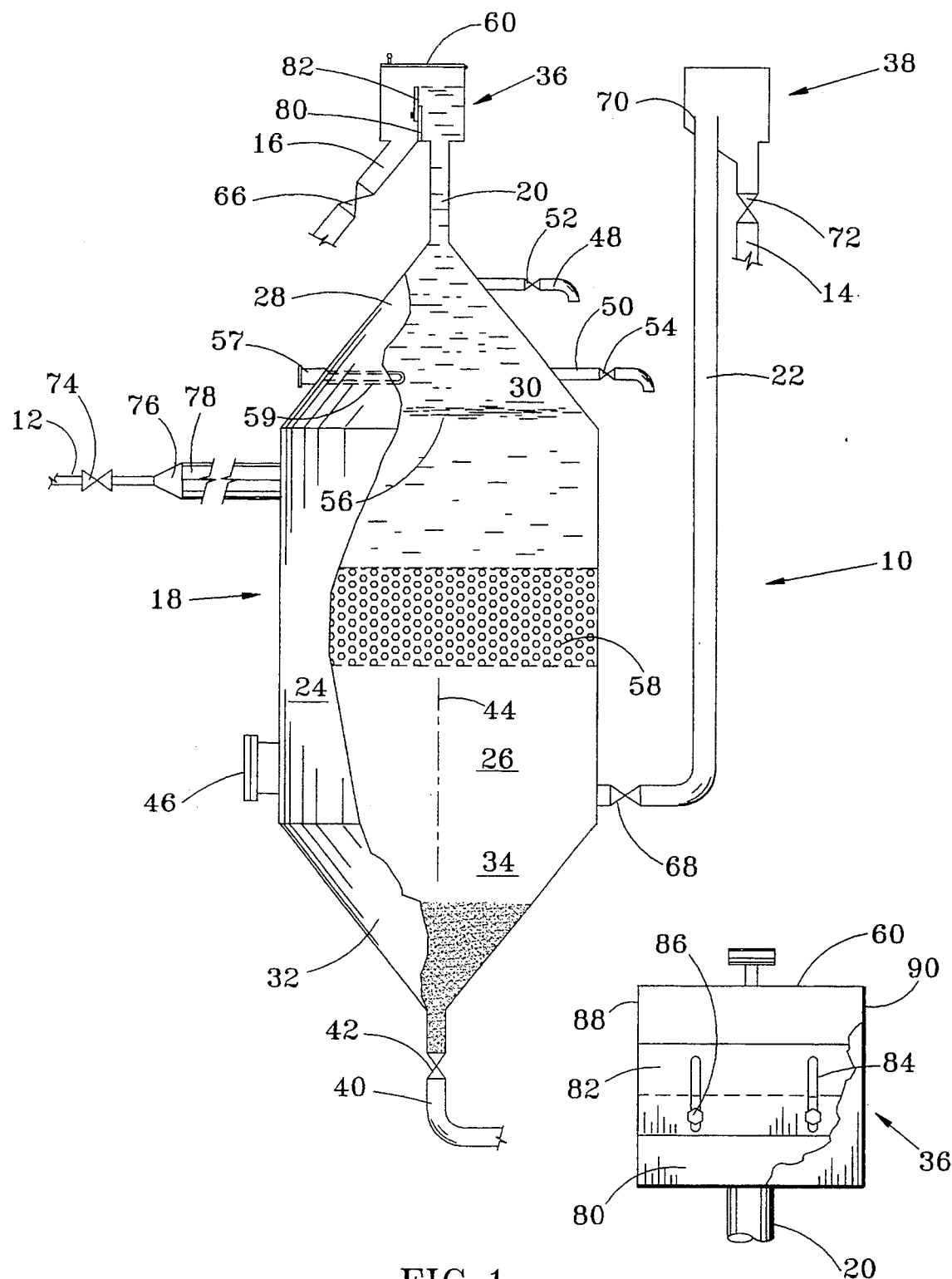
FIG. 1 is a pictorial and cross-sectional view of one embodiment of an oil/water separator according to the present invention.
FIG. 2 is a more detailed side view of the adjustable oil weir overflow generally shown in FIG. 1.

FIG. 1 generally depicts an oil/water separator unit 10 for purifying waste water in accordance with the present invention. Waste water from an industrial complex, petrochemical facility, manufacturing plant, etc. typically may contain water, various hydrocarbons, such as oil, and often more volatile fluids, such as benzene. Waste water flows continually to one or more separators units through input flow line 12. A surge tank may optionally be provided for temporarily storing high flow volumes, and the volume of stored fluids may be released during periods of low flow volumes. Cleaned water is continually discharged from the separator 10 through discharge line 14, and oil is similarly continually removed via line 16.

The separator unit 10 comprises a separator tank 18, an oil leg line 20, and a water leg line 22. The separator tank houses an oil/water interface, as explained below, and includes a cylindrical portion 24 defining a similarly configured inlet chamber 26, a frustroconical upper portion 28 defining upper separation chamber 30 adjoining the chamber 26, and a frustroconical lower portion 32 defining a solids collection chamber 34. Since the upper separation chamber 30 is frustroconical, it has a horizontal cross-sectional area which continually decreases with increased spacing from the inlet chamber 26. The oil leg line 20 is a riser or pipe having a uniform diameter, with a lower oil inlet adjacent the top of the separation chamber, and an upper oil outlet. An adjustable oil overflow unit 36 is provided adjacent the oil outlet, and discussed subsequently. The water leg 22 is in parallel with the separator tank, and has an inlet in fluid communication with a lower portion of the cylindrical inlet chamber 26, and an outlet spaced vertically between the upper separation chamber 30 and the oil outlet. A water overflow unit 38 is provided adjacent the water outlet.

The lower portion 32 defines a solids collection chamber 34 for periodically removing accumulated sludge through line 40 by opening valve 42. Influent may be continually input to the unit 10, and water, oil and sludge may be continually output from the unit. Alternatively, oil and water may be continually output, as explained above, and sludge may be intermittently removed through line 40. It is not necessary to terminate influent flow to the unit 10, however, in order to remove accumulated solids collection chamber 34. A manhole access 46 is provided in the side of the portion 24. The tank 18 has a central axis 44, and each of the chambers 26,32, and 34 are preferably axially aligned, with the chambers being vertically positioned as shown in FIG. 2. As explained further below, each separation tank is sized to receive a desired maximum influent fluid flow rate, e.g., 1000 liters/minute. A suitable base support (not shown) is conventionally provided for affixing to the portion 32. A pair of vertically spaced taps 48 and 50 may be provided respectively above and below the presumed location of the oil/water interface. The corresponding valves 52 and 54 may be intermittently opened to sample fluid at the level of each tap. Additional ports 57 may be provided for receiving heating elements, such as element 59 simplistically shown in FIG. 1. An electronic sensor (not shown) alternatively may be used to monitor the level of the oil/water interface. The unit of the present invention does not require careful monitoring and control of the different material interfaces, however, since a properly designed and constructed unit is able to handle different influent concentrations, and will allow the interface to move vertically within the tank 18 while still continually outputting the separated fluids. Compared to prior art separators, less operator interaction is thus required to operate the unit 10 under varying conditions. A coalescing medium 58 may be provided within the chamber 26, and diffusion baffles (not shown) may optionally be mounted within the lowermost portion of the inlet chamber 26. A coalescing medium sold by Yeager under the Tri-Paks trademark as a tower packing has been successfully used, although other porous medium packings with a large surface area per volume may be employed. All entering fluid does not pass through this medium 58, and much of the oil migrates upward into chamber 30 to reduce plugging problems.

Fluid passes from process flow line 12 past valve 74, then through expansion unit 76 and inlet pipe 78 to enter the interior of the separation unit 10. Fluid is preferably input tangentially into the cylindrical chamber 26. The vertical height of the inlet pipe relative to the chamber 26 will depend upon the application and material to be separated. For an oil/water mixture, the inlet pipe 78 preferably will be positioned in the upper portion of the chamber 26, as depicted in FIG. 1. It is important that the inlet pipe be sized to minimize turbulence of the influent and achieve laminar flow. For an axial length of at least two meters, the inlet pipe 78 has a uniform cross-sectional flow area sized so that the velocity of the influent (for the rated maximum fluid flow rate of the separation unit) is less than about 30 meters per minute. This flow velocity over a length of at least two meters prior to entering the chamber 26 achieves the desired non-turbulent fluid flow characteristics which facilitate separation. Those skilled in the art will appreciate that the expansion unit 78 further assists this goal, but may not be necessary if the length of the inlet pipe 78 is increased.

Water flows out the lower portion of the inlet chamber 26, then through normally open valve 68 and up the water leg line 22, which has a uniform cross-sectional flow area and is in parallel with the tank 18. Conveniently, the water leg line 22 is provided outside the tank 18, although the water leg could be located within the tank 18 and rise through the top of the conical portion 28, if desired. Water flows through leg 22 to the water overflow unit 38, which includes a circular-shaped weir 70 having a length defined by the circumference of line 22. Alternatively, weir 70 may be structurally and operationally similar to a weir 82 located so as to control overflow from oil leg line 20. Water overflowing the weir 70 passes through valve 72 and may flow via line 14 to another separator unit for further recycling, or to a municipal water system.

A water leg (or balance leg) 22 and the oil leg (or light material leg) 20 are each sized under the "maximum load" assumption that 100% of the influent will pass through each of these legs at any particular point in time. Each of these legs are also sized to reasonably minimize construction costs. It is important, however, that the water leg 22 have a uniform cross-sectional area which creates the required head pressure within the upper separation chamber 30, recognizing that this head pressure is a function of both the columnar height and the velocity of fluid within water leg 22. In general, the cross-sectional area of the water leg is sized such that the fluid velocity in this leg will be between 10 and 20 meters per minute, and preferably less than about 15 meters per minute. If the viscosity of the oil in the input oil/water mixture is high, a higher water leg velocity approaching 20 meters per minute may be necessary to achieve the desired pressure in the chamber 30 for enhanced separation efficiency.

More particularly, the water leg line is sized such that the flow velocity of fluid in the water leg is less than about 15 meters/minute, under the assumption that all influent is water. If $A_{wl}$ is the cross-sectional area of the water leg expressed square meters, and Q is the maximum anticipated influent flow rate expressed in cubic meters/minute, divided by meters per minute (for velocity), then the desired relationship is $$A_{wl} \geq 15\, Q \quad \text{Eq.1}$$

Expressed structurally, the cross-sectional area of the water leg, $A_{wl}$, preferably is at least twice the cross-sectional area of the inlet 78, since the fluid velocity in the water leg is at least half the desired inlet fluid velocity. The above equation recognizes that the dynamic head pressure is a function of not only the height of the column of fluid, but also the velocity of the fluid flowing in that column, and the viscosity of the flowing fluid.

The oil leg 20 also has a substantially uniform cross-sectional area, so that no "dead areas" are in the oil leg. Oil continually moves at a substantially uniform velocity up the oil leg, thus eliminating premature biodegradation. The desired cross-sectional area of the oil leg will in part also be a function of the density and viscosity of the recovered oil, since the oil must be able to flow up the oil leg without allowing water to channel past the oil to the top of the oil leg. Preferably the cross-sectional area of the oil leg is sized so that oil moves upward through the oil leg at a rate of less than about 7.5 meters/minute.

The oil leg is sized such that the velocity of fluid in the oil leg is less than about 7.5 meters/minute, under the assumption that all influent is oil. If $A_{ol}$ is the cross-sectional area of the oil leg expressed in square meters, and Q is as defined above, then the desired relationship is $$A_{ol} \geq 7.5\, Q \quad \text{Eq.2}$$

Again expressed structurally, the cross-sectional area of the oil leg, $A_{ol}$ is preferably at least twice the cross-sectional area of the water leg, $A_{wl}$, and thus at least four times the cross-sectional area of the inlet 78.

For more viscous oils, a large oil leg cross-sectional area must be maintained to reduce the velocity in this leg, to minimize movement of the oil/water interface, and to reduce pressure necessary to pass oil through this leg 20. If the viscosity of the oil decreases, the cross-sectional area of this leg 20 may also decrease, since less pressure will be required to move oil through this leg. The cross-sectional area of the oil leg may be reduced, so that fluid velocity in this leg is about 10 meters/minute, for light viscosity oils. The vertical height of the oil leg will vary with the height of the water leg, since the dynamic head pressure in each of these legs must be balanced to maintain the interface at its desired location within the separator. Oil flows through the leg 20 and over weir 82, with the upper portion of the weir being vertically adjustable by bolt and nut assemblies 64. The height of oil in the leg 20 may thus be controlled by regulating the height of the adjustable weir 82. Oil overflowing weir 62 passes by line 16 through normally open valve 66 to an oil recovery tank (not shown). The pressure drop per meter due to the flow of oil is significantly greater than the pressure drop per meter due to the flow of water because of the higher viscosity of oil. At 100% oil influent, the oil/water interface desirably will likely be at the elevation of the inlet 78. At 100% water influent, this interface will be near the apex of the chamber 30.

The inlet chamber 26 for the unit 10 is preferably a cylindrical-shaped chamber, and is sized so that the fluid in this chamber maintains a substantially uniform downward velocity of less than about 18 cm/minute (again assuming all influent passes downward through this chamber). This relatively slow velocity of water in the inlet chamber provides sufficient retention time within the chamber 24 for the separation of materials. The length or vertical height of the chamber 26 is designed to obtain a desired contact fluid time when passing through the coalescing medium.

It should be understood that a difference in columnar height, delta, exists between the water leg and the oil leg due to the difference in liquid densities. While the separation unit is operating, fluid flow over the weirs is a dynamic condition, and both the viscosity of the hydrocarbons separated from the water and the flow rate of the cleaned water and the flow rate of hydrocarbons passing through the water leg and oil leg, respectively, affect the operation of the weirs. A one inch difference in the actual weir height delta (top of the water weir only one inch below the top of the oil weir) may result in an actual columnar height difference of 3.8 inches if the separated fluid is gasoline, but may result in an actual columnar height difference of 7.7 inches if the separated hydrocarbon is diesel. High viscosity oil will thus "stack-up" higher above a weir before it overflows than will gasoline. To desirably minimize movement of the oil/water interface in the chamber 30, a minimum oil stacking height over the oil weir is obtained by using a long oil weir length, and more particularly a length which is at least as long as the length of the water weir.

Referring now to FIGS. 1 and 2, the length of the water weir is determined by the circumference of the water leg 22. Water thus continually flows over the entire top lip 70 of the pipe 22 and then flows out the overflow unit 38 through pipe 14. Oil flow over the oil weir is preferably adjustable, and the oil overflow unit 36 is sized for accommodating the variable stacking heights of hydrocarbons required for different operations, as explained above. Fixed base plate 80 extends over the width of the oil overflow unit 36, and is sealed at its edges, for example by welding. Top plate 82 is vertically adjustable relative to the base plate 80, and includes a pair of slots 84 for receiving bolt and wingnut assemblies 86. The length of the plate 82 extending between sides 88 and 90 of the oil overflow unit thus defines the overflow weir length, and this length is preferably at least as great as the length of the weir 70 (defined by this circumference of pipe 22).

The process for sizing oil/water separator as discussed above will now be described. As previously noted, the unit is sized for a maximum quantity of influent, e.g., 1000 liters per minute, which estimated or known fluid quantity is typically provided by the unit operator. For this quantity of influent, the diameter and length of the cylindrical chamber 30 may be determined, as explained above. The conical chamber 30 typically will have a height of approximately 0.75 times the diameter of chamber 26, which will result in a desired conical apex angle of from 60° to 90°. The diameter of the inlet pipe 78 is controlled to a desirable obtain an influent flow velocity of less than 30 meters per minute over a length of at least two meters (it may not always be practical that inlet pipe 78 be two meters in length, but this typically would be desired). The diameter of the oil leg is established to obtain a velocity of less than 7.5 liters per minute based upon the maximum concentration of 100% oil in the input oil/water mixture. The water leg diameter is sized (based upon 100% water influent) to achieve a flow velocity of 15 meters per minute or less for the balanced leg. The water weir height be set at a desired position above the chamber 30, and the oil weir height may be adjusted to achieve the desired delta to maintain the oil/water interface at a desired location with respect to the separation chamber 30. This oil/water interface may rise if the influent is 100% water, but nevertheless will generally be maintained just below or within the conical separation chamber. If the operator of the unit 10 knows that the maximum oil concentration of the influent to the unit will significantly less than 100%, e.g., maximum concentration of oil will be 20%, then the oil leg cross-sectional area may be sized for this maximum oil flow rate.

Although the invention has been described in detail with respect to separating oil or a similar hydrocarbon from water, it should be understood that the concepts of the present invention may be used to separate various dissimilar fluids, and in a broad sense the water and oil may be considered first and second materials which are separated by the techniques of the present invention. Accordingly, the apparatus and methods described herein may be used for separating oil from water at a well head, and may also be used to separate oils or other hydrocarbons having different densities.

Figure 3:
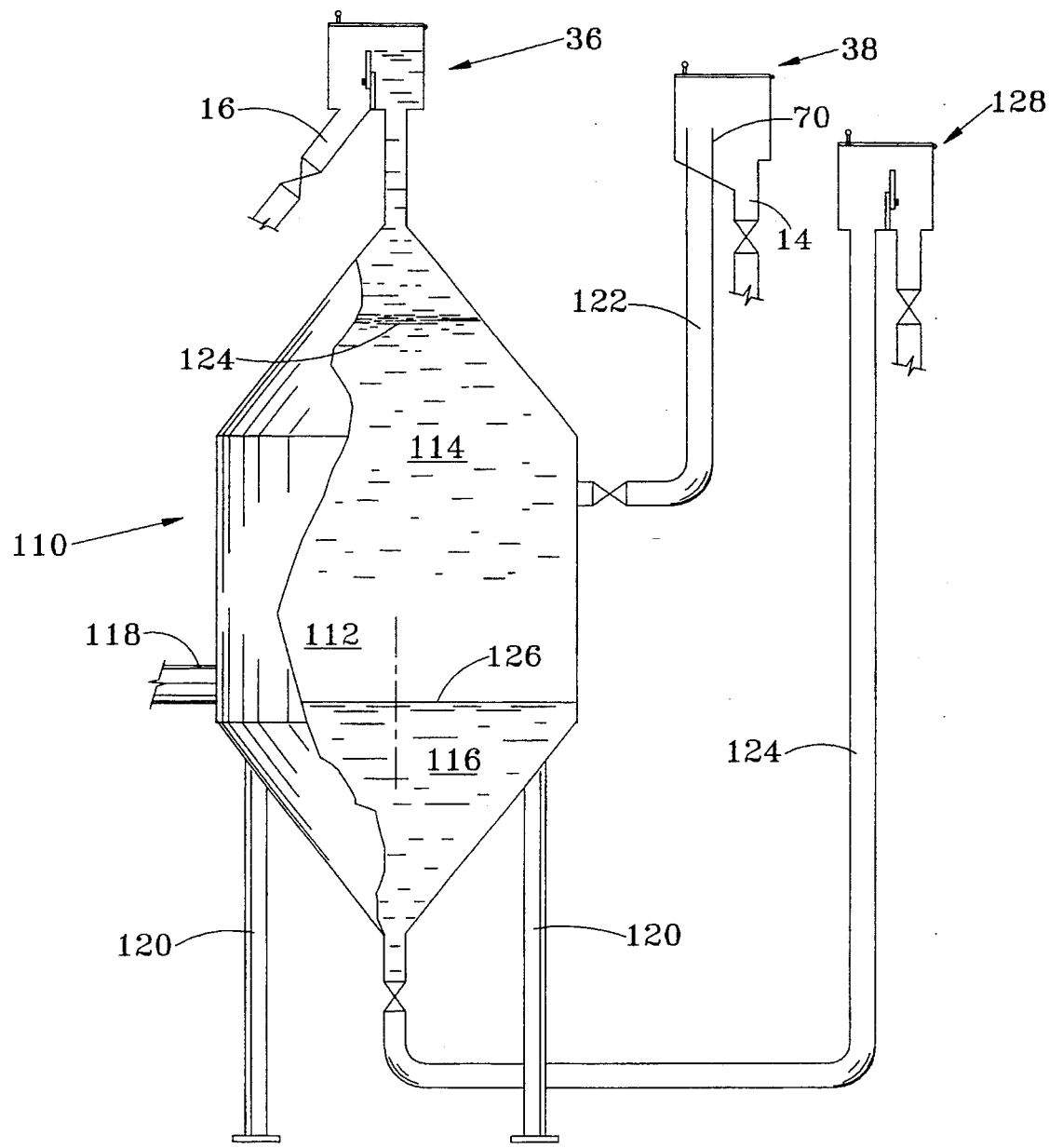
FIG. 3 is a simplified cross-sectional view of an oil/water/creosote separator according to this invention.

FIG. 3 discloses an alternate embodiment of a separator 110, which for exemplary purposes may be used to separate a mixture of creosote, oil, and water. Creosote alone typically contains some quantity of penta chloro phenol (PCP), which is similar in density to a light oil, so that the unit 110 may be used with a creosote/water influent, and output cleaned water, creosote (which is more dense than water), and a relatively small quantity of oil or PCP. In this case, a separation of the oil and water is not as difficult as the separation of creosote and water due to the density similarity of these latter liquids.

Separator unit 110 is similar to the unit 10 previously described, and accordingly many of the details and options shown for the unit 10 are not shown in FIG. 3 for simplicity, and are not discussed with respect to FIG. 6. Structural legs 120 are, however, depicted in FIG. 3 for supporting the unit 110 in a conventional manner. The unit 110 includes a cylindrical input chamber 112, a frustroconical upper oil separation chamber 114, and a frustroconical lower creosote separation chamber 116. Each of the chambers may be configured and sized as previously noted. The line 118 provided for circumferentially inputting the influent to the input chamber 112 is spaced at a location within the lower portion of the input chamber 112, and the output for the input leg line or balanced leg 122 is in the upper portion of the chamber 112. The creosote/input interface 126 may either be maintained within the lower creosote chamber 116 or within a lower portion of chamber 112 adjacent the chamber 116, depending on the concentration of creosote in the influent.

Oil overflow unit 36 and the input overflow unit 38 may be sized to achieve the desired flow velocities as described above. Creosote leg line 124 is sized to maintain a fluid velocity of less than 7.5 meters per minute, and thus is cross-sectional on $A_{cl}$ may be substantially equal to the cross-sectional area of the oil leg, $A_{ol}$. Creosote overflow unit 128 may be structurally similar to the overflow unit 36 previously described, and is also adjustable. The separation unit 110 functions in a manner similar to the unit 10 to separate oil and input, but additionally the water leg line 122 and the creosote leg line 124 are sized to provide and maintain a creosote/water interface 126 within or slightly above the chamber 116.

It should also be understood that the techniques of the present invention may be used to separate solid materials from a fluid which has a density different than the solid material density. For example, plastic having a density of less than water may be separated from water using the techniques of the present invention. In this case, the adjustable overflow units as discussed above may not be desirable, and instead an auger powered by a drive motor may be used to draw the separated plastic pellets from the top of the leg 20, which in this case would be a plastic pellet leg rather than an oil leg. Again, the level of pellets within the upper portion of the separation chamber.

Multi-stage separator units, each generally similar to the unit 10 described above, may also be used to separate a mixture of oil, water, and dirt (sand). Cleaned water from a first stage unit may be input so that a sufficiently liquid slurry is obtained to pump oil and sand to the stage 2 separator. The cleaned water from each successive stage separator may be input to the bottom of the preceding stage separator, so that dirt and water (with an increasingly smaller amount of oil) are pumped as a slurry to the subsequent separator stage. Depending on the desired level of oil separation to be achieved, the final stage will thus output relatively cleaned sand, cleaned water, and oil. Also, dirty oil may be heated, hydrochloric acid added, and a mixture fed to a separator 10 to achieve separation of cleaned oil and water.

Although the separation tank for the unit 10 preferably includes a cylindrical portion and an upper conical portion, as discussed above, it should be understood that other configurations are possible, but are not preferred since they will generally increase the cost for manufacturing the units. For example, the water inlet chamber for the unit 10 may be fabricated to have a rectangular cross-sectional configuration, although additional reinforcing members may be required to prevent bursting of the water inlet tank. In this case, the separation chamber will likely not be conical-shaped, but rather likely have the configuration of a pyramid, with the base of the pyramid corresponding to the upper portion of the input inlet chamber. Even in this latter case, however, the cross-sectional area of the separation chamber continually decreases with increased spacing from the input inlet chamber to maximize the efficiency of the separation process.

Those skilled in the art will also appreciate that various mechanisms other than outlet taps may be used to monitor the elevation of each of the interfaces. While sophisticated electronic interface monitoring units and/or transparent port holes may be used to monitor the level of the interfaces, each of these monitoring techniques substantially increases the cost of the units without adding significantly to the capabilities of the apparatus. It should be understood, however, that such conventional interface monitoring mechanisms may be used and are within the scope of this invention.

The foregoing disclosure and description of the invention are thus illustrative and explanatory of the apparatus and techniques of the present invention. and various changes in the size and shape of the units, as well as the details of the construction, may be made within the scope of the appended claims and without departing from the spirit of the invention.

What is claimed is:

1. Apparatus operable for continually receiving and separating a mixture of oil and water, comprising:
    a separation tank including an inlet chamber and an upper separation chamber spaced above and adjoining the inlet chamber, the upper separation chamber having a horizontal cross-sectional area which continually decreases with increased spacing from the inlet chamber;
    a fluid inlet means to the separation tank for continually inputting the mixture of oil and water into the separation tank, the fluid inlet means to the separation tank having a uniform cross-sectional area sized to maintain an inlet fluid velocity to the separation tank of less than about 30 meters per minute, and the fluid inlet means to the separation tank being affixed to the separation tank and arranged for substantially tangential input of the mixture of oil and water to the separation tank;
    an oil leg line spaced above the upper separation chamber, the oil leg line having a substantially uniform cross-sectional flow area, an oil inlet adjoining the separation chamber, and an oil outlet above the oil inlet;
    a water leg line spaced in parallel with the separation chamber, the water leg line having a water leg inlet in fluid communication with the inlet chamber and a water leg outlet spaced vertically between the oil separation tank and the oil outlet, the water leg line having a substantially uniform cross-sectional area greater than twice the uniform cross-sectional area of the fluid inlet means;
    an adjustable oil overflow unit adjacent the oil outlet arranged for controlling the height of oil in the oil leg line relative to the height of water in the water leg line; and
    the oil overflow unit creating a dynamic head pressure in the oil leg line relative to the dynamic head pressure in the water leg line to maintain an oil/water interface within the separation tank.

2. The apparatus as defined in claim 1, wherein the inlet chamber has a uniform cross-section area sized to maintain a downward fluid velocity in the inlet chamber of less than 18 centimeters per minute.

3. The apparatus as defined in claim 1, wherein the oil leg line has a uniform cross-sectional area which satisfies the relationship $$A_{ol} \geq 4 A_i$$

where $A_{ol}$ is the cross-sectional area of the oil leg line, and $A_i$ is the cross-sectional area of the fluid inlet.

4. The apparatus as defined in claim 1, wherein the inlet chamber has a substantially cylindrical configuration, and the separation chamber has a substantially frustroconical configuration.

5. The apparatus as defined in claim 4, wherein the separation chamber is substantially uniform about a separation tank axis, and has an apex angle of from 60° to 90°.

6. The apparatus as defined in claim 1, further comprising:
a sludge removal chamber spaced below and adjoining the inlet chamber.

7. Apparatus operable for continually receiving and separating a mixture of at least first and second materials having different densities, the apparatus comprising:
a separation tank including an inlet chamber and a separation chamber spaced vertically above and adjoining the inlet chamber, the separation chamber having a horizontal cross-sectional area which continually decreases with increased spacing from the inlet chamber;
an inlet means to the separation tank for continually inputting the mixture of first and second materials into the separation tank, the inlet means to the separation tank having a uniform cross-sectional area sized to maintain an an input velocity to the separation tank of less than about 30 meters per minute, and the inlet means to the separation tank being affixed to the separation tank and arranged for substantially tangential input of the mixture of the first and second materials to the separation tank;
a second material leg line spaced above the separation chamber, the second material leg line having a substantially uniform cross-sectional flow area, a second material inlet adjoining the separation chamber, and a second material outlet above the second material inlet;
a first material leg line, the first material leg line having a first material inlet in fluid communication with the inlet chamber and arranged for passing first material to a first material outlet spaced above the first material inlet, the first material leg line having a substantially uniform cross-sectional area greater than about twice the uniform cross-sectional area of the fluid inlet means;
a second material overflow unit adjacent the second material outlet for controlling the height of second material in the second material leg relative to the height of the first material outlet; and
the second material overflow unit arranged for creating a head pressure in the second material leg line relative to head pressure in the first material leg line to maintain a first material/second material interface within the separation tank.

8. The apparatus as defined in claim 7, further comprising:
the separation tank including another separation chamber spaced opposite the separation chamber and adjoining the inlet chamber, the another separation chamber having a horizontal cross-sectional area which decreases with increased spacing from the first material inlet chamber;
a third material leg line extending from the another separation chamber, the third material leg line having a substantially uniform cross-sectional flow area, a third material fluid inlet adjoining the another separation chamber, and a third material fluid outlet above the third material fluid inlet; and
a third material overflow unit spaced adjacent the third material outlet for controlling the height of the third material in the third material leg line.

9. The apparatus as defined in claim 7, wherein the second material leg line has a uniform cross-sectional area which satisfies the relationship $$A_{sm} \geq 4 A_i$$

where $A_{sm}$ is the cross-sectional area of the second material leg, and $A_i$ is the cross-sectional area of the inlet.

10. The apparatus as defined in claim 9, wherein the diameter of the inlet chamber is sized to maintain a vertical flow velocity in the inlet chamber of less than 18 cm/minute.

11. The apparatus as defined in claim 7, wherein the inlet chamber has a substantially cylindrical configuration, and the separation chamber has a substantially frustroconical configuration.

12. The apparatus is defined in claim 7, further comprising:
a coalescing medium within the separation tank spaced at a location within the inlet chamber between the inlet means and the first material inlet.

13. A method of separating a mixture of first and second materials having different densities, comprising:
forming an inlet chamber;
forming a separation chamber spaced vertically from and adjoining the inlet chamber, the separation chamber having a horizontal cross-sectional area which continually decreases with increased spacing from the inlet chamber;
forming a second material leg line extending from and above the separation chamber, the second material leg line having a substantially uniform cross-sectional flow area, a second material inlet adjoining the separation chamber, and a second material outlet above the second material inlet;
forming a first material leg line, the first material leg line having a first material inlet in fluid communication with the inlet chamber, and a first material outlet spaced above the first material inlet;
continually inputting the mixture of first and second materials tangentially into the separation chamber at a laminar flow velocity; and
adjusting the elevation of the second material outlet for the second material leg line relative to the first material outlet for the first material leg line to maintain a first material/second material interface at a desired elevation.

14. The method as defined in claim 13, further comprising:

forming another separation chamber spaced vertically from and adjoining the inlet chamber, the another separation chamber having a horizontal cross-sectional area which continually decreases with increased spacing from the first material inlet chamber;

forming a third material leg line extending from and above the another separation chamber, the third material leg line having a substantially uniform cross-sectional flow area, a third material inlet adjoining the another separation chamber, and a third material outlet above the third material inlet; wherein the step of continually inputting the mixture of first and second materials consists of inputting a mixture of at least first, second and third materials; and further comprising the step of adjusting the elevation of the third material outlet relative to the first material outlet.

15. The method as defined in claim 13, further comprising:

forming an inlet to the first material inlet chamber of uniform cross sectional area sized to continually maintain a flow velocity of input mixture less than approximately 30 meters per minute.

16. The method as defined in claim 13, further comprising:

sizing the uniform flow area of the second material leg line to continually maintain a flow velocity of second material through the second material leg line of less than approximately 7.5 meters/minute.

17. The method as defined in claim 13, further comprising:

sizing the inlet chamber to maintain a vertical flow velocity of first material in the inlet chamber of less than 18 cm/minute.

18. The method as defined in claim 13, further comprising:

forming the first material leg line so as to have a uniform cross sectional area to continually maintain a flow velocity of first material through the first material leg line of less than approximately 15 meters/minute.

19. The method as defined in claim 13, further comprising:

sizing the uniform cross-sectional area of the second material leg line to satisfy the relationship $$A_{sm} \geq 7.5\, Q$$

where $A_{sm}$ is the cross-sectional area of the second material leg line, and Q is the maximum flow rate of the input mixture.

20. The method as defined in claim 13, further comprising:

forming the first material leg line so as to have a uniform cross sectional area to satisfy the relationship $$A_{fm} \geq 15\, Q$$

where $A_{fm}$ is the cross-sectional area of the first material leg line, and Q is the maximum flow rate of the input mixture.

* * * * *